United States Patent [19]

Pereira et al.

[11] 4,081,094
[45] Mar. 28, 1978

[54] CONVEYOR-TRAILER FOR TRANSPORTING AN AGRICULTURAL COMMODITY

[75] Inventors: Ernest G. Pereira, San Jose; Guy W. Fitch, Cupertino, both of Calif.

[73] Assignee: Cotton Machinery Company, Inc., Livermore, Calif.

[21] Appl. No.: 778,702

[22] Filed: Mar. 17, 1977

[51] Int. Cl.$^2$ .................................................. B60P 1/38
[52] U.S. Cl. ................................... 214/355; 214/83.36; 214/505; 198/310
[58] Field of Search ............... 214/350, 355, 356, 357, 214/358, 359, 501, 505, 506, 508, 509; 198/310

[56] References Cited

U.S. PATENT DOCUMENTS

| | | | |
|---|---|---|---|
| 2,082,673 | 6/1937 | Williamson | 214/355 |
| 3,209,932 | 10/1965 | Schiltz | 214/355 X |
| 3,334,760 | 8/1967 | Bollinger et al. | 214/355 |
| 3,415,400 | 10/1968 | Olin | 214/505 |
| 3,894,646 | 7/1975 | Head et al. | 214/83.26 X |
| 4,019,643 | 4/1975 | Kampman et al. | 214/505 |

*Primary Examiner*—Albert J. Makay
*Attorney, Agent, or Firm*—Jack M. Wiseman

[57] ABSTRACT

A conveyor-trailer for transporting cotton, which is mounted on a long-bed truck trailer. The conveyor-trailer is pivotally mounted on the bed of the truck trailer and hydraulic means moves the conveyor-trailer between a horizontal position and a position inclined upwardly toward the forward end of the truck trailer. Mounted on the conveyor-trailer is a servo mechanism which engages automatically a wheel on the truck trailer when the conveyor-trailer is in the inclined position and disengages automatically the wheel on the truck trailer when the conveyor is in the horizontal position. An hydraulic drive motor is connected to the conveyor of the conveyor-trailer to impart movement thereto under the control of the servo mechanism. When the servo mechanism is spaced from the wheel of the truck trailer, the conveyor of the conveyor-trailer is idle. When the servo mechanism engages the wheel of the truck trailer, the conveyor of the conveyor-trailer is driven by the hydraulic drive motor at a speed commensurate with and synchronous with the rotation of the wheel of the truck trailer.

7 Claims, 9 Drawing Figures

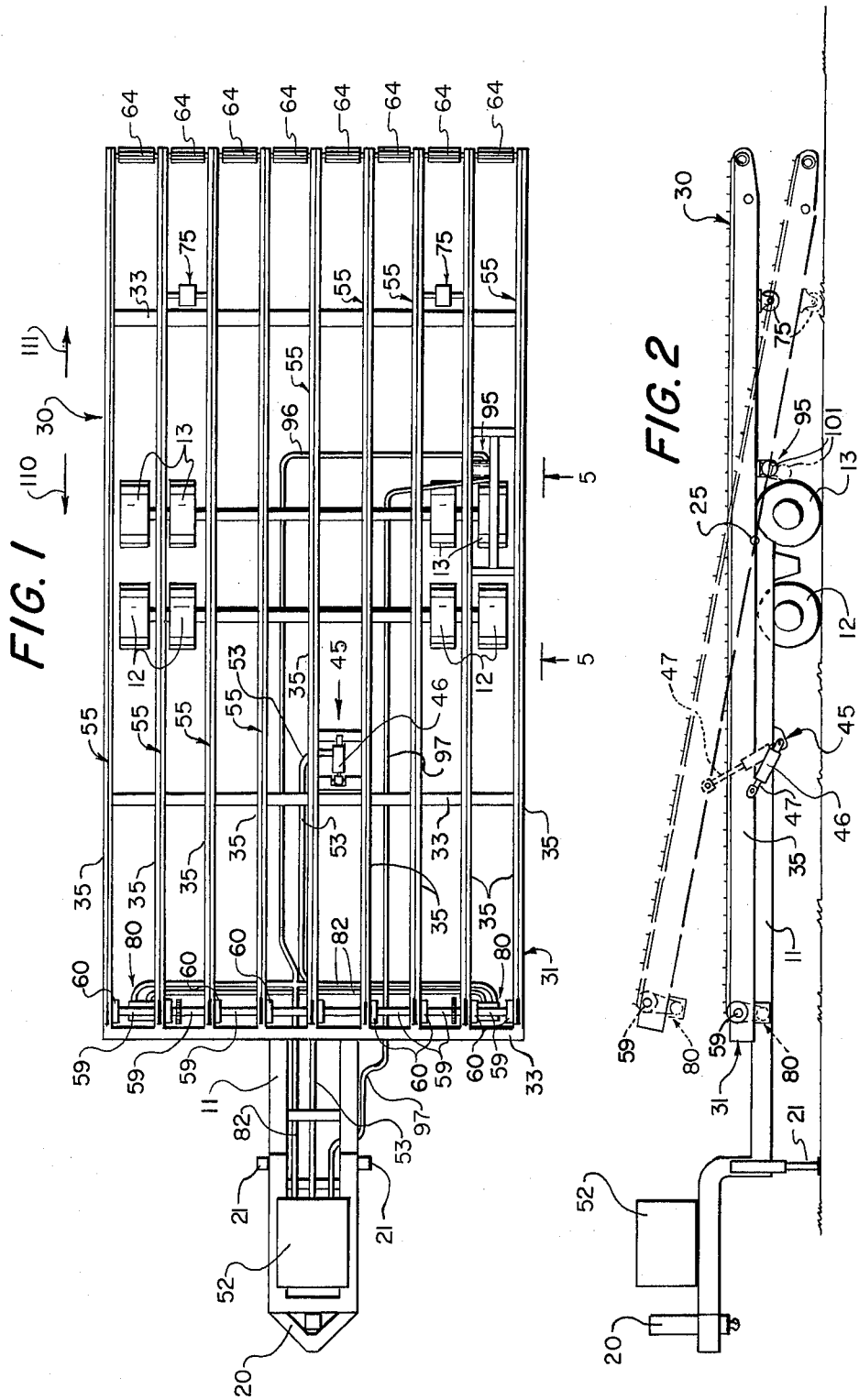

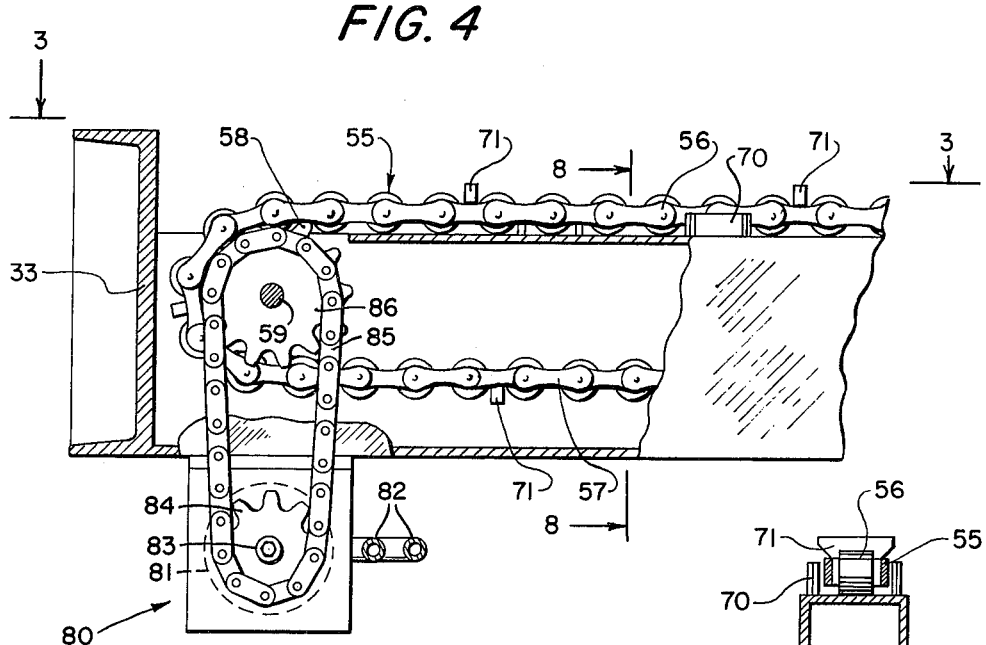
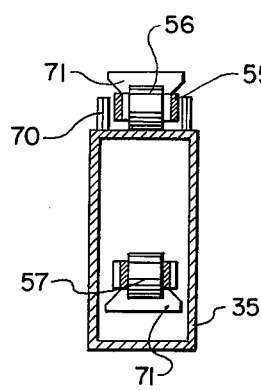
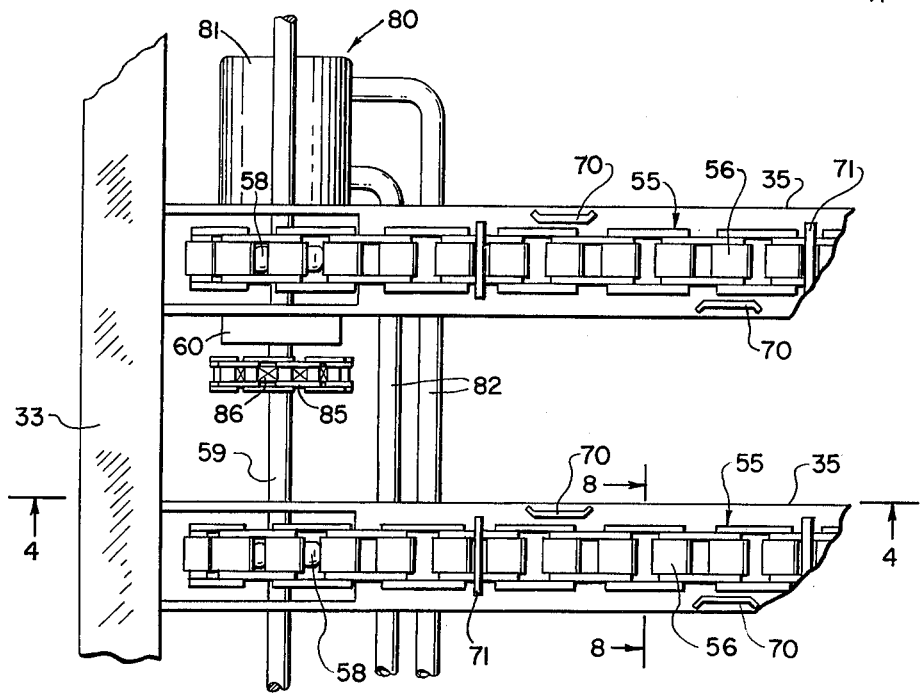

CONVEYOR-TRAILER FOR TRANSPORTING AN AGRICULTURAL COMMODITY

BACKGROUND OF THE INVENTION

The present invention relates in general to trailers for hauling agricultural products and more particularly to a conveyor-trailer for loading, transporting and unloading cotton.

In the patent to Schiltz U.S. Pat. No. 3,298,550, issued on Jan. 17, 1967, for a Haystack Transporting Device, there is disclosed a trailer for loading, transporting and unloading haystacks. The trailer comprises a conveyor that is movable between a horizontal position for transporting haystacks and an inclined position for loading and unloading haystacks onto or from the trailer. For advancing the conveyor while it is in an inclined position, an auxiliary transmission is driven by a truck transmission. A power take-off mechanism from the auxiliary transmission drives another transmission mechanism. The other transmission mechanism drives the conveyor so that the speed of travel of the conveyor is commensurate with the speed of travel of the truck. The employment of a power take-off system for driving the conveyor is more cumbersome, increases the cost of the machine, and reduces the efficiency of the machine. Another patent of interest is the patent to Schiltz U.S. Pat. No. 3,209,932.

SUMMARY OF THE INVENTION

A conveyor-trailer for transporting cotton or other goods and commodities which is adapted for mounting on a bed of a truck trailer or the like. The conveyor-trailer is movable between a horizontal position for transporting a commodity, such as cotton, and a position inclined toward the forward end of a truck trailer or the like. While the conveyor-trailer is in the inclined position, a commodity, such as cotton, is either loaded on or unloaded from the conveyor-trailer. A servo mechanism is mounted on the conveyor-trailer for movement therewith and engages a wheel of the truck trailer or the like while the conveyor-trailer is in the inclined position and disengages the wheel of the truck trailer or the like while the conveyor is in the horizontal position. A drive mechanism imparts movement to the conveyor under the control of the servo mechanism, whereby the conveyor is idle while the conveyor-trailer is disposed in the horizontal position and the conveyor is driven at a speed commensurate with the speed of rotation of the drive wheel of the truck trailer while the conveyor-trailer is in the inclined position.

By virtue of this arrangement, the need for an expensive power take-off arrangement has been obviated. Thus, power efficiency has been increased, while costs have been reduced.

DESCRIPTION OF THE DRAWINGS

FIG. 1 is a plan view of the conveyor-trailer embodying the present invention mounted on a flatbed of a truck trailer.

FIG. 2 is a side elevation view of the conveyor-trailer shown in FIG. 1 mounted on the flatbed of the truck trailer.

FIG. 3 is an enlarged fragmentary plan view of an hydraulic conveyor drive mechanism for the conveyor of the conveyor-trailer shown in FIGS. 1 and 2.

FIG. 4 is a fragmentary vertical sectional view taken along line 4—4 of FIG. 3 to illustrate the hydraulic conveyor drive mechanism for the conveyor of the conveyor-trailer shown in FIGS. 1 and 2 with the longitudinal frame support housing shown partially in section and partially in elevation.

FIG. 8 is a vertical sectional view taken along line 8—8 of FIG. 4 to illustrate the longitudinal frame support housing employed for the conveyor of the conveyor-trailer shown in FIGS. 1 and 2.

DESCRIPTION OF THE PREFERRED EMBODIMENT

Figure 5:
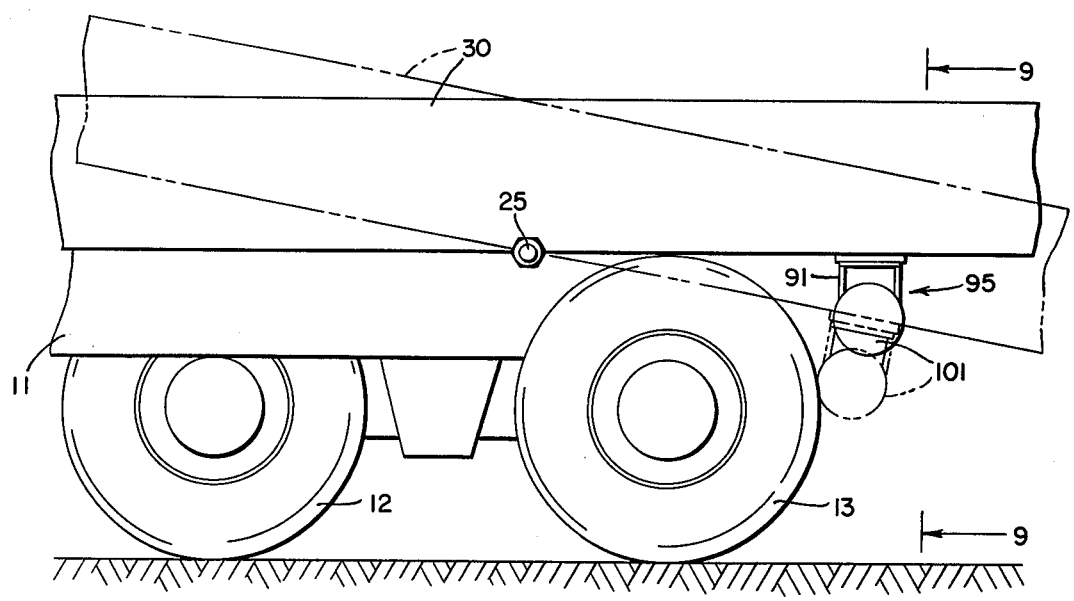
FIG. 5 is an enlarged fragmentary elevation view taken along line 5—5 of FIG. 1 to illustrate an hydraulic servo mechanism mounted on the conveyor-trailer shown in FIGS. 1 and 2 and an engageable truck trailer wheel.

Illustrated in FIGS. 1 and 2 is a suitable truck bed 11 for hauling agricultural commodities, such as cotton or the like. The truck bed 11 may be in the form of a trailer or integral with the cab of a truck, not shown. As is well-known, the truck bed 11 is supported by suitable sets of wheels 12 and 13. In the exemplary embodiment, there are four wheels in each set of wheels 12 and 13, and each set of wheels 12 and 13 is mounted on a common axle, respectively. The wheels are rotated in a conventional manner either as trailer wheels or by a direct drive, not shown, from the engine of a truck, not shown.

The elongated bed 11, when a trailer, is detachably mounted to the cab of a truck, not shown, through a suitable hitch 20. Retractable legs 21 support the forward end of the bed 11 when the hitch 20 is detached from the cab and the bed 11 is in the form of a trailer. Mounted on the bed 11 for pivotal movement about a suitable pivot shaft 25 (FIGS. 2 and 5) between a horizontal position and a position inclined toward the forward end thereof is a conveyor-trailer 30. The hitch or cab end is considered herein toward the forward end. The conveyor-trailer 30 comprises a suitable support frame 31 (FIGS. 1 and 2) having side rails 35 which are joined by transverse cross rail 33.

When the conveyor-trailer 30 is in the horizontal position as shown by solid line in FIGS. 2 and 5, the conveyor-trailer is in the cotton transporting condition. When the conveyor-trailer 30 is in the position inclined toward the forward end of the truck trailer bed 11, as shown by interrupted lines or dash lines in FIGS. 2 and 5, the conveyor-trailer 30 is either loading cotton or unloading cotton.

For moving the conveyor-trailer 30 between the horizontal position and the inclined position about the pivot shaft 25, an hydraulic lifting mechanism 45 is provided (FIG. 2). The hydraulic lifting mechanism 45 comprises a suitable hydraulic cylinder 46 having a piston rod 47 projecting therefrom. The piston rod 47 is pivotally connected to the frame 31 of the conveyor-trailer 30 and the cylinder 46 is pivotally connected to the trailer bed 11 through a suitable depending ear. This arrangement will move the conveyor-trailer 30 between a horizontal position and the inclined position by the application of fluid under pressure into the cylinders 46 in a well-known and conventional manner from a source 52 of fluid under pressure. The source of fluid pressure 52 is mounted on the forward end of the conveyor-trailer 30. A suitable hydraulic power supply serves as the source of fluid under pressure. A suitable hose 53 interconnects an output of the source 52 with the hydraulic cylinder 46.

For loading and unloading commodities, such as cotton, the conveyor-trailer 30 comprises a plurality of longitudinally extending, transversely spaced endless conveyor chains 55 (FIGS. 1, 3, 4 and 6–8). Each of the conveyor chains 55 is mounted in a respective support member 35 for rotation and defines an upper flight 56 and a lower flight 57. The forward end of each of the endless conveyor chains 55 is trained around a sprocket 58 (FIGS. 1, 3 and 4). The sprockets 58 are fixed to a transversely disposed drive shaft 59 for rotation therewith. The drive shaft 59 is journalled on the forward ends of the support members 35, respectively, for rotation through suitable bearing blocks 60 fixed to the frame 31. Thus, the drive shaft 59 and the sprockets 58 are fixed to the frame 31 for movement therewith.

Figure 7:
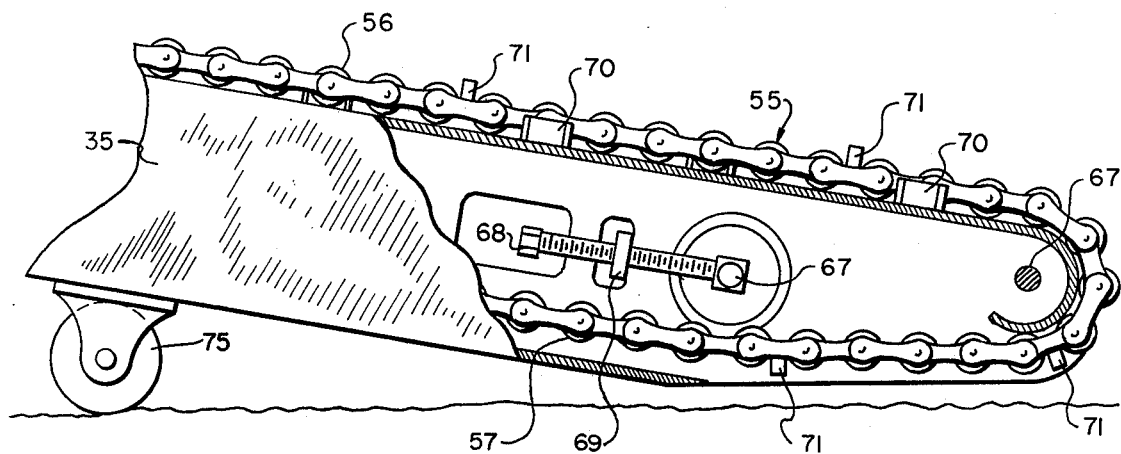
FIG. 7 is a fragmentary vertical sectional view taken along line 7—7 of FIG. 6 to illustrate the mounting arrangement, tension adjustment arrangement and rollers for the rearward end of the conveyor of the conveyor-trailer shown in FIGS. 1 and 2 with the longitudinal frame support housing broken away.
Figure 6:
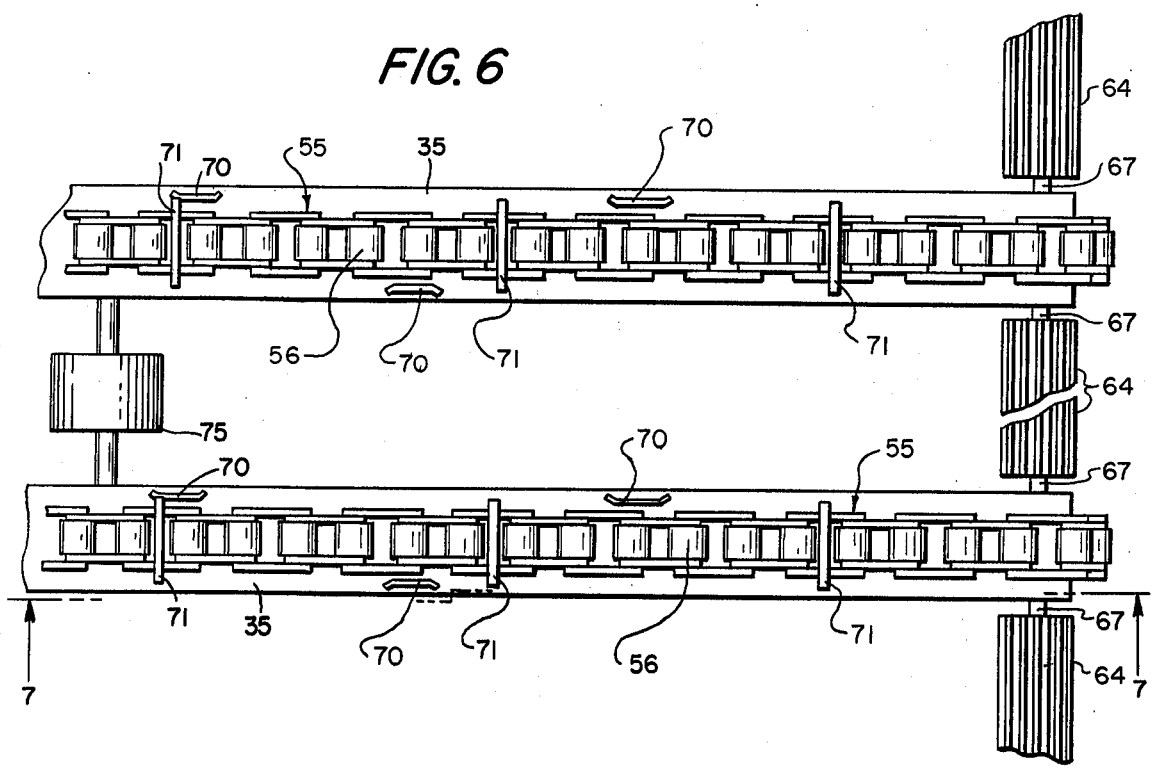
FIG. 6 is an enlarged fragmentary plan view of the mounting arrangement and rollers for the rearward end of the conveyor for the conveyor-trailer shown in FIGS. 1 and 2.

The rear ends of each of the endless chains 55 are trained between chain guides 70 (FIG. 7). Axially aligned, transversely spaced shafts 67 are carried by the support members 35, respectively, and are adjustably positioned therealong in the generally longitudinal direction. Live or freely rotatable transversely aligned rollers 64 are journalled for rotation on the shafts 67. The opposite ends of the shafts 67 (FIG. 7) project through aligned openings in the side walls of the support member 35 and are carried by adjustment bolts 68 in projecting ears 67 on the side walls of the support members 35. With this arrangement, the conveyor chains 55 may be adjusted to the desired degree of tension by adjusting the nuts 69 on the bolts 68.

The upper flights 56 of the conveyor chains 55 are disposed for movement within and past the chain guides 70 (FIG. 8), which are integral with the upper walls of the support members 35. The lower return flights 57 of the conveyor chains 55 are disposed within the hollow interiors of the support members 35, respectively. The conveyor chains 55 are spaced by the double pitch, oversize rollers 64. The rollers 64 are longitudinally spaced along its associated chains 55 and are axially aligned with rollers 64 of adjacent rows. The conveyor chains 55 are provided with outwardly extending, longitudinally spaced flight attachments 71 for gripping and lifting cotton to be loaded on the conveyor chains 55.

When the conveyor-trailer 30 is in the inclined position, the rear ends of the support members 35 are disposed in close proximity to the ground. When the conveyor-trailer 30 is backed toward or into cotton to be loaded, the end portions of the support members 35 (FIGS. 1, 2, 6 and 7) serve to move under the cotton to be loaded. For aiding the rear end of the support members 35 in moving under the cotton to be loaded and to reduce damage to the rear end of the support members 35, rollers 75 are fixed to the lower wall of the support members 35, respectively, near the rear ends thereof.

According to the present invention, the conveyor chains 55 are driven by suitable drive means 80 (FIGS. 1–4). In the exemplary embodiment, the drive means 80, which are supported by the frame 31 of the conveyor-trailer 30, comprise hydraulic drive motors 81 that are fixed to a support housing 35. Suitable fluid under pressure is supplied to the hydraulic drive motors 81 from the source 52 of fluid under pressure through suitable hoses or couplings 82, which are of sufficient length to accommodate the movement of the frame 31 relative to the bed 11. Drive shafts 83 are rotated by the hydraulic drive motors 81 and are journalled for rotation by the support housing 35 through suitable depending brackets.

Fixed to the drive shafts 83 for rotation therewith are drive sprockets 84 around which are trained drive chains 85. The drive chains 85 are trained around driven sprockets 86 for imparting rotation thereto. The driven sprockets 86 are journalled for rotation by the support housings 35. The driven sprockets 86 are fixed to the shaft 59 to impart rotation thereto. Fixed to the shaft 59 for rotation therewith are chain drive sprockets 58. The rotation of the shaft 59 imparts rotation to the sprockets 58 for driving the endless conveyor chains 55.

The operation of the hydraulic drive motor 81 is controlled by a suitable servo mechanism, such as an hydraulic servo mechanism 95 (FIGS. 1 and 5). It is within the contemplation of the present invention to employ a mechanically powered servo motor. The hydraulic servo mechanism 95 is mounted on the frame 31 of the conveyor-trailer 30 through a support bracket 91 for movement therewith and communicates with the hydraulic drive motor 81 through a hose or coupling 96. Fluid under pressure is supplied to the hydraulic servo mechanism 95 through a suitable hose or coupling 97 from the source 52 of fluid under pressure. The coupling 97 is of sufficient length to accommodate the movement of the frame 31 relative to the trailer bed 11.

Figure 9:
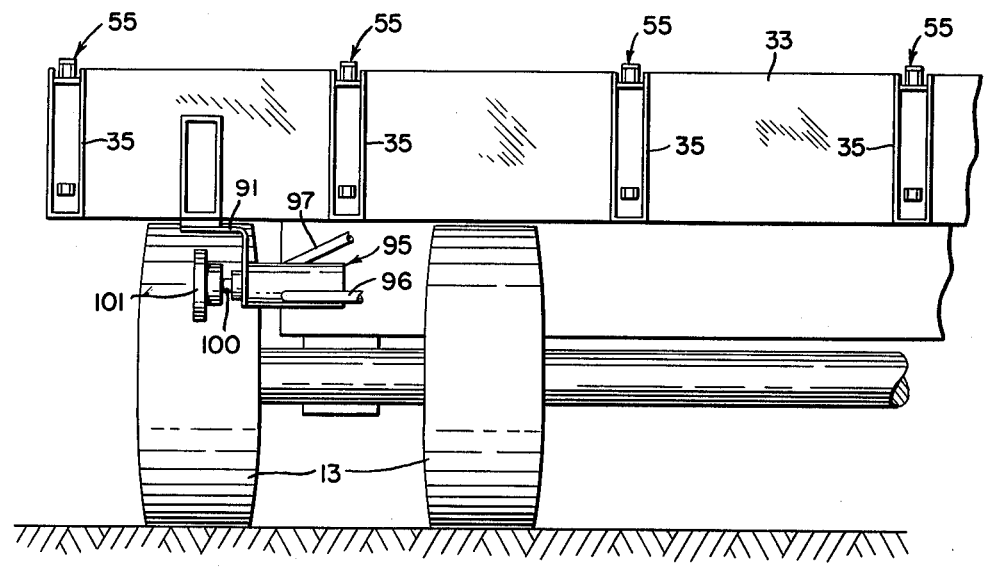
FIG. 9 is an enlarged elevation view of the hydraulic servo mechanism shown in FIG. 5 taken along line 9—9 of FIG. 1.

The hydraulic servo mechanism 95 is movable with the frame 31 of the conveyor-trailer 30 and controls the operation of the hydraulic drive motor 81 through the coupling 96. As shown in FIGS. 1, 2 and 9, the hydraulic servo mechanism 95 includes a shaft 100 that is journalled for rotation by the bracket 91. Fixed to the shaft 100 for imparting rotation thereto is a wheel 101. When the conveyor-trailer 30 is in the horizontal position (FIGS. 2 and 5), the wheel 101 of the hydraulic servo mechanism 95 is spaced automatically from the wheel 13 of the trailer bed 11 and is, therefore, disengaged therefrom as shown by dotted lines in FIGS. 2 and 5. Thus, the shaft 100 does not rotate and the hydraulic servo mechanism 95 causes the hydraulic drive motor 81 to idle the conveyor drive chains 55.

When the conveyor-trailer 30 is in the inclined position (FIGS. 2 and 5), the wheel 101 of the hydraulic servo mechanism 95 automatically engages the wheel 13, as shown by dotted lines in FIGS. 2 and 5) to rotate the shaft 100 of the hydraulic servo mechanism 95. The rotation of the shaft 100 by the engagement between the wheel 13 and the wheel 101 causes the hydraulic servo mechanism 95 to control the operation of the hydraulic drive motor 81 so that the speed or rate of movement of the conveyor drive chains 55 is commensurate with and is synchronous with the rotation of the wheel 13 of the trailer bed 11 or the ground speed of the trailer bed 11.

When the conveyor chains 55 advance the upper flight 56 thereof in the direction of an arrow 110 (FIG. 1) or the forward end of the conveyor-trailer 30, commodities, such as cotton, are loaded onto the conveyor-trailer 30. When the conveyor chains 55 advance the upper flight 56 thereof in the direction of an arrow 111 (FIG. 1) or toward the rearward end of the conveyor-trailer 31, commodities, such as cotton, are unloaded from the conveyor-trailer 30. The speed of chain movement during the loading and unloading of commodities is regulated by the hydraulic servo mechanism 95 so that the distance traveled by the upper flights of the conveyor chains 55 in the inclined position is comparable to the distance traveled by the trailer bed 11 during loading and unloading of the commodities on the conveyor-trailer 30. When the conveyor-trailer 30 is in the horizontal position, the commodities, such as cotton, are being transported by the conveyor-trailer 30 and the trailer bed 11.

The reversing of the direction of travel of the conveyor chains 55 is accomplished merely by reversing the direction of travel of the truck which, in turn, reverses the direction of rotation of the wheels 13. This action reverses the direction of rotation of the servo wheel 101 of the servo mechanism 95. The servo mechanism 95 controls both the rate and direction of the fluid flow.

We claim:

1. Means for transporting agricultural commodities comprising:
   a. a first frame;
   b. a wheel for supporting said first frame for movement along a surface;
   c. a conveyor frame supported by said first frame for pivotal movement;
   d. means interconnecting said first frame and said conveyor frame for moving said conveyor frame between a horizontal position and an inclined position;
   e. conveyor means carried by said conveyor frame for movement therewith and journalled by said conveyor frame for advancement relative to said conveyor frame;
   f. independent power drive means for said conveyor means supported by said conveyor frame for movement therewith and connected to said conveyor means for advancing said conveyor means relative to said conveyor frame; and
   g. a servo mechanism mounted on said conveyor frame for movement therewith and coupled to said independent power drive means for controlling the speed at which the independent power drive means operates said conveyor means, said servo mechanism including a servo roller spaced from said wheel when said conveyor frame is in the horizontal position and disposed in engagement with said wheel to be rotated thereby when said conveyor frame is in the inclined position, said servo mechanism being responsive to the rotation of said servo roller for controlling the speed of operation of said independent power drive means to idle said conveyor means when said servo roller is spaced from said first wheel and to advance said conveyor means at a rate commensurate with and synchronous with the rotation of said wheel when said servo roller engages said wheel.

2. Means as claimed in claim 1 wherein said servo roller is disposed in and out of engagement with said wheel in response to said means moving said conveyor frame between the horizontal and inclined positions.

3. Means as claimed in claim 2 wherein said independent power drive means includes an hydraulic drive motor and said servo mechanism is in the form of an hydraulic servo mechanism.

4. A vehicle as claimed in claim 3 wherein said conveyor means includes a plurality of longitudinally extending, transversely spaced endless drive chains.

5. A vehicle as claimed in claim 4 wherein the rear end of said conveyor frame approaches ground level when said conveyor frame is in the inclined position and comprising a plurality of ground engaging means mounted on said conveyor frame in transversely spaced relation below the rear end of said conveyor chains respectively.

6. A vehicle as claimed in claim 5 wherein each of said conveyor chains includes an upper flight and a lower flight, and wherein said conveyor frame comprises a plurality of longitudinally extending, transversely spaced, hollow support members for supporting said conveyor chains respectively, each of said support members being arranged to guide the associated upper flight within and around an open channel and to guide the associated lower flight within an enclosed channel.

7. A vehicle as claimed in claim 6 wherein said means interconnecting said first frame and said conveyor frame comprises an hydraulic cylinder fixed to said first frame with a piston projecting from said hydraulic cylinder and linkage connected to said conveyor frame actuated by the movement of said piston for moving said conveyor frame between the horizontal position and the inclined position.

* * * * *